US005885395A

United States Patent [19]
Western

[11] Patent Number: 5,885,395
[45] Date of Patent: Mar. 23, 1999

[54] MASKING METHOD AND DEVICE

[76] Inventor: Donald Murray Western, 16 Colston Avenue, Carshalton, Surrey SM5 2NU, United Kingdom

[21] Appl. No.: 608,328

[22] Filed: Feb. 28, 1996

[30] Foreign Application Priority Data

Feb. 28, 1995 [GB] United Kingdom ........ 9504025
Oct. 13, 1995 [GB] United Kingdom ........ 9520952

[51] Int. Cl.[6] ........ B32B 35/00

[52] U.S. Cl. ........ 156/247; 156/280; 156/293; 427/282

[58] Field of Search ........ 427/282; 428/41.3, 428/41.5, 41.7, 41.8; 156/306.3, 216, 247, 249, 280, 293

[56] References Cited

U.S. PATENT DOCUMENTS

| | | | |
|---|---|---|---|
| 1,960,137 | 5/1934 | Brown | 154/43 |
| 3,117,902 | 1/1964 | Holzheimer | 156/217 |
| 3,536,569 | 10/1970 | Gosnell | 156/527 |
| 3,629,034 | 12/1971 | Kuroda | 156/219 |
| 3,724,420 | 4/1973 | Quinn | 118/505 |
| 3,758,992 | 9/1973 | Olson | 49/489 |
| 3,884,132 | 5/1975 | Snodgrass | 93/59 MT |
| 3,930,069 | 12/1975 | Stephens | 427/142 |
| 4,313,970 | 2/1982 | Jones et al. | 427/56.1 |
| 4,507,330 | 3/1985 | Schaaf | 427/261 |
| 4,591,137 | 5/1986 | Steinberg | 267/182 |
| 4,714,633 | 12/1987 | Horiki et al. | 427/282 |
| 4,740,256 | 4/1988 | Vosberg | 156/73.1 |
| 4,759,959 | 7/1988 | Guy | 427/282 |
| 4,764,421 | 8/1988 | Horiki et al. | 428/35 |
| 4,868,045 | 9/1989 | Horiki et al. | 428/314.4 |
| 5,128,176 | 7/1992 | Schmidt | 427/140 |
| 5,260,097 | 11/1993 | Silvestre | 427/282 |

FOREIGN PATENT DOCUMENTS

| | | | |
|---|---|---|---|
| 0207720 | 1/1987 | European Pat. Off. | B05C 21/00 |
| 0248652 | 12/1987 | European Pat. Off. | B05C 21/00 |
| 0249444 | 12/1987 | European Pat. Off. | B05D 1/32 |
| 0256782 | 2/1988 | European Pat. Off. | B05C 21/00 |
| 0257872 | 3/1988 | European Pat. Off. | B05C 21/00 |
| 0262946 | 4/1988 | European Pat. Off. | B05C 21/00 |
| 0263637 | 4/1988 | European Pat. Off. | B05C 21/00 |
| 0302270 | 2/1989 | European Pat. Off. | B62D 27/06 |
| 2611631 | 6/1977 | Germany | F16J 13/02 |
| 8607368 | 6/1986 | Germany . | |
| 885660 | 12/1961 | United Kingdom . | |

OTHER PUBLICATIONS

Tesa Catalog, Aug. 1973, pp. 55, 56, 128, 129.

*Primary Examiner*—Michael W. Ball
*Assistant Examiner*—Michael A. Tolin
*Attorney, Agent, or Firm*—Moore & Van Allen, PLLC

[57] ABSTRACT

A method is described of painting a vehicle having adjacent body panels (2,3) with a gap therebetween in such a way as to prevent overspray from entering the gap. The method comprises adhering one edge of a foamed plastics strip (4) to the vehicle in the region of the gap, forming a loop (8) longitudinally of the strip so that the loop lies within the gap substantially parallel therewith and applying a paint spray to the panel or panels, whereby the looped strip prevents paint from entering the gap. Also, described is a foamed strip for use in spray painting of vehicles which comprises a web of foamed plastics material having adhesive applied to opposite faces of the strip, the adhesive being confined to an area (5,6) close to an edge of the strip. (FIG. 2)

5 Claims, 2 Drawing Sheets

MASKING METHOD AND DEVICE

This invention relates to the masking of vehicles and provides a method and device for preventing paint over spray from entering gaps between body panels of the vehicle.

When carrying out automotive body repairs, there is frequently a requirement to refinish one body panel and to prevent paint over spray from reaching an adjacent panel. Typical situations where this arises are where body panels are separated by a gap such as a gap between a door and a door frame, or front or back wing, a boot lid from the surrounding panel or a bonnet lid from a front wing or a facia panel.

Conventionally, the paint sprayer prevents paint reaching the undamaged panel by use of masking tape and paper or plastic sheets. There is, however, a problem in preventing paint from entering gaps of the kind referred to above in a foolproof and simple manner. There is a further difficulty that if masking tape is used to protect the panel which is not to be repainted, that the edge of the masking tape tends to form a weir or dam causing the freshly sprayed paint to build up and form an edge which subsequently has to be removed, e.g. by polishing or buffing.

The present invention is concerned with a solution to these problems and, in particular, provides a method and device whereby the preparation of the vehicle for refinishing can be carried out more conveniently and, in a preferred embodiment, the problem of build up of paint in the region of the edge of the panel can be avoided.

According to one aspect of the present invention there is provided a method of painting a vehicle having adjacent body panels with a gap therebetween, said method comprising adhering one edge of a foamed plastics strip to the vehicle in the region of the gap, forming a loop longitudinally of the strip so that the loop lies within the gap substantially parallel therewith and applying a paint spray to the panel or panels, whereby the looped strip prevents paint from entering the gap.

Preferably, the method is carried out in such a way that the loop of foamed strip is positioned in such a way that the surface of the body panels lies substantially tangentially to the outer curved surface of the loop. Thus, the loop of foam may lie substantially within the gap between the body panels but has a tip of its curved surface essentially aligned with the surface of the body panels, or slightly protruding therefrom. By positioning the foam in this way, an elongate recess or pocket is formed between a curved portion of the surfaces of loop and the body panel. As the paint is sprayed into this recess, the tapering surfaces of the loop and recess cause turbulence in the paint spray which results in a blending of the paint coating to the edge of the panel without any build-up of paint.

While it is theoretically possible to apply adhesive to the vehicle and then adhere the foam to the vehicle, this is not very convenient in practice. It is preferred, therefore, to apply the adhesive to the strip in the region of the edge. The adhesive may be applied to the edge of the foamed strip but, generally, it is easier and more convenient to apply the adhesive to a face of the strip in the region of the edge. The adhesive can be applied as discontinuous areas, e.g. as spots, along the length of the strip but it is preferred to apply a continuous adhesive track longitudinally of the strip. A loop is more conveniently formed by applying the adhesive to opposite faces of the strip, with the adhesive confined to an area close to an edge of the strip. The greatest flexibility in forming the loop is achieved by applying two longitudinal tracks to opposite surfaces, each track being confined to an area close to opposite edges of the strip.

There is, however, one embodiment of the invention where it is preferred that there should be single adhesive track in the region of one edge only of the strip and this will be described in more detail below.

The invention also includes a foamed strip for use in spray painting of vehicles comprising a web of foamed plastics material having adhesive applied to opposite faces of the strip, the adhesive being confined to an area close to an edge of the strip.

The foamed strip preferably is formed from a foam having open cells, especially in the region of the surface. A foam of this kind may be produced by mixing a foam-forming plastics composition, together with a blowing agent and curing and expanding the foam to form a large block of foam. Such a foam block will often have a non-permeable and plastic skin and internal interconnecting cells.

A foam of the desired structure having open cells at its surface is produced by slitting the block lengthwise, e.g. by drawing the foam block through a series of knives. The cut surface will then have an open cell structure. This is desirable for two reasons. First, a pressure-sensitive adhesive applied to an open-celled foamed surface will bond much more readily to such a surface in comparison with a painted metal surface such as a vehicle body. Therefore, there will be very little tendency for the adhesive to be pulled off the foam and remain on the body of the vehicle when the foam is removed after the painting operation.

Secondly, the open-celled structure in the surface of the foam will further contribute to the turbulence producing effect in the region of the recess during the paint spraying operation.

The foam block is preferably manufactured by foaming a plastics composition within a mould. Any suitable plastics material capable of being foamed to produce a resiliently compressible material may be used. Suitable types of foamable plastics are described in detail in, for example, Kirk-Othmer Encyclopaedia of Chemical Technology, Third Edition, Vol. 11, pages 82 to 126. Such foams include polystyrene, PVC, polyethylene, polyurethane, polyisocyanate, polyester and polysilicone foams. The foams are preferably of open cell structure and generally foams having a density in the range of 10 to 55 kgs, preferably 10 to 30 kgs per cubic metre are useful for the purposes of the invention. Any suitable blowing agent such as volatile liquids, e.g. hydrofluorocarbons and hydrocarbons such as butane may be used. In the case of polyurethane foams, water is a suitable blowing agent.

The choice of an open-celled foam and the positioning of the loop away from the adhesive track or tracks is important. While not wishing to be bound by any particular theory, it is believed that the paint ridges which are formed when masking tape is used to mask an area to be painted are caused by the layer of adhesive which forms a dam which is impenetrable to paint. In contrast, the loop of open-celled foam which seals off a panel gap allows penetration of some paint and the adhesive track is removed by a substantial distance from the area of the seal.

Polyurethane foams may be manufactured by mixing a polyol, such as a polyether-glycol, toluene diisocyanate and a blowing agent. If water is used as the blowing agent, it reacts with the isocyanate to produce carbon dioxide, which is the effective blowing agent. Details of procedures for the manufacture of polyurethane foams can be found in Chapter 7 of “Polyurethanes Chemistry, Technology and Applications” by Zygmunt Wirpsza, English Edition, published by Ellis Horwood Ltd., 1993.

The adhesive coating may be applied by spray or other applicator to the foam after the block has been slit into strips. The adhesive may be applied in a track or band extending longitudinally of the conduit. Where two or more adhesive tracks are applied to the strip, these are preferably applied simultaneously. The pressure-sensitive adhesive is prepared by blending an elastomeric polymer, a tackifying resin and an anti-oxidant. Suitable elastomeric polymers include natural and synthetic rubbers, acrylic polymers and ethylene-vinyl acetate polymers. Preferred polymers are block copolymers comprising styrene/butadiene or styrene/isoprene block polymers.

Tackifying resins include polyterpenes, hydrogenated rosin and $C_5$ hydrocarbon resins.

Anti-oxidants include hindered phenols. The adhesive may be applied from a solution or hot-melt. Suitable solvents include petroleum fractions, e.g. naphtha. It is preferable, however, to apply the adhesive as a hot melt. The hot melt may be applied as one or more tracks to a release paper strip and then transferred by contact and pressure to the polyurethane foam strip, preferably while the adhesive is still soft or liquid. A Kraft paper having a siliconised coating may be coated with the hot melt adhesive using a slot coater machine and then transferred to the polyurethane strip. Depending on the degree of tack, the polyurethane strip can be coiled with or without an intervening release paper. The degree of tack can be varied by adjusting the amount of tackifying resin incorporated in the adhesive.

The invention will now be illustrated with reference to the accompanying drawings, in which.

Figure 1:
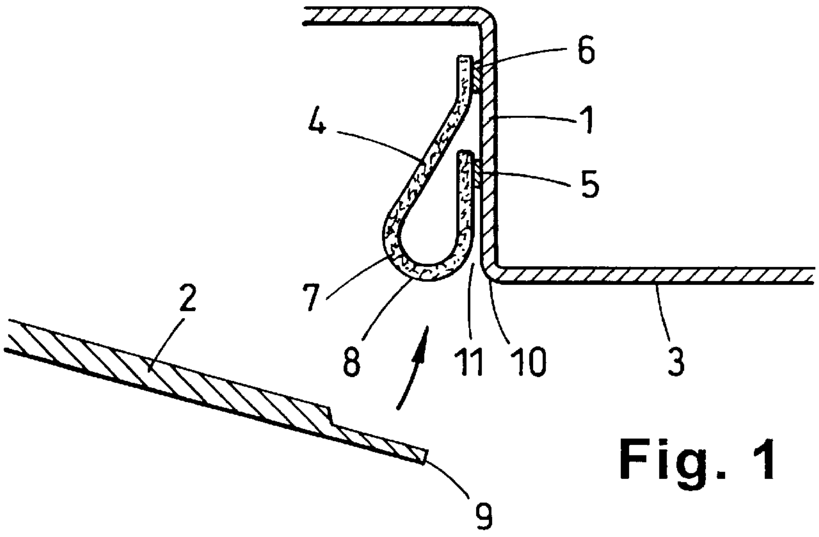
FIG. 1 is a section through the B-frame of a vehicle door, also showing part of the vehicle door.
Figure 2:
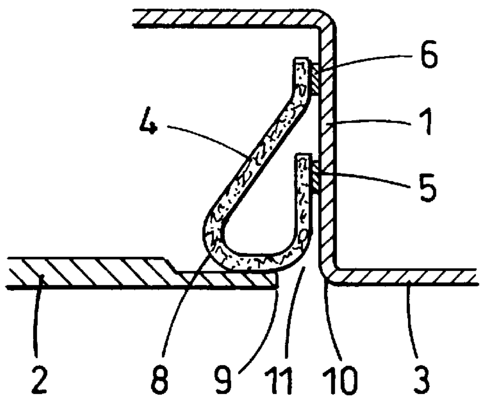
FIG. 2 is a view similar to FIG. 1 except that the door has been closed onto the foamed strip.

Referring to the drawings, and in particular to FIGS. 1 and 2, this shows a vehicle B-frame (1) and a section of a door (2) about to close onto the B-frame. Assuming it is desired to spray paint the surface of a panel (2) and/or (3) adjacent to the B-frame, the foamed polyurethane masking strip is adhered to the B-frame (1) in the following manner. Strip (4) has an adhesive track (5) along one edge of the strip and a second adhesive track on the opposite surface, but close to the opposite edge. Adhesive track (5) is bonded first to the B-frame (1) in a convenient position and adhesive track (6) is then bonded to the same B-frame in a position so as to produce a loop portion (7) whose outer surface (8) is generally aligned with the surface (3) of the panel to be refinished, or protrudes slightly beyond it. Loop (7) is also positioned so that edge (9) when closed, seals against a surface (8) of the loop.

FIG. 2 shows the situation in which the door (2) has been closed onto the loop portion (7) thereby forming a seal between the door and the loop. The paint spray applied up to the edge (10) of the panel (3) will not be able to enter the gap between the door and the body panel (3) by virtue of the seal against the foam strip. In addition, the loop of foam (7) forms with the body panel (3) a pocket (11) having outwardly curved surfaces. A pocket shaped in this way produces a swirling effect on a paint spray thereby avoiding a build up of paint in the demarcation zone between the edge of the panel and the B-frame (1). Similarly paint applied to the door panel 2 will be prevented from entering the gap between the door edge 9 and the surface 8 of the loop.

After the paint has dried, the foam strip (4) can be removed without leaving any mark on the B-frame (1), the adhesive (5 and 6) remaining on the foam.

Figure 2A:
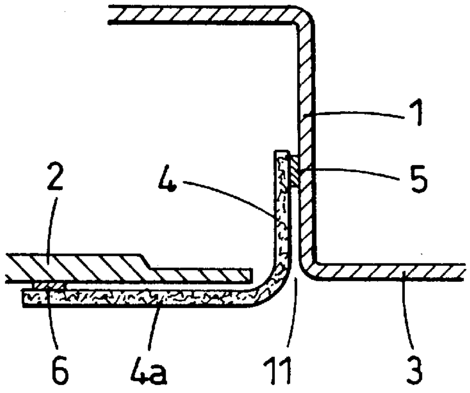
FIG. 2A is a view similar to FIG. 2 showing the arrangement in which only the body panel is to be sprayed.

FIG. 2A illustrates the use of the foam strip in a case where the panel 3 only is to be refinished. In this case instead of doubling the foam back on itself, the foam strip is adhered to the door pillar 1 by the track 5 so that it protrudes from the gap and is then overlapped onto the outside of the closed door 2 where it is bonded by the track 6. Paper or plastic sheets can then be attached to the outer surface 4A of the strip to protect the door panel 2 from any over spray applied to panel 3. Again a pocket 11 is formed between the curved surface of the shallow looped strip and the panel 3 and this imparts the desired turbulence of the paint spray as described above.

Figure 3:
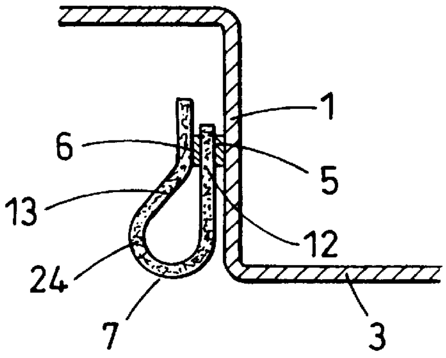
FIG. 3 is a view similar to FIG. 2, but without showing the door, of a second embodiment of the strip.

A variation of the foam strip shown in FIGS. 1, 2, and 2A is shown in FIG. 3. This is also shown adhered to a vehicle B-frame (1) having a panel (3) to be painted. In this case, the foam strip (24) is of similar thickness and width to the foam strip (4) shown in FIG. 1. However, instead of having an adhesive track on the faces of the foam at both edges as in FIG. 1, the foam strip (24) has adhesive tracks on opposite faces of the foam at one edge only. The foam strip (24) therefore has two track s (5 and 6) on opposite faces at one edge (12) of the strip.

With this construction, a loop can be formed in the desired juxtaposition with regard to the panel (3) by adhering the adhesive (6) to the desired point along the face (13) of the foam strip. It is, however, preferred to have adhesive tracks at opposite edges as shown in FIGS. 1 and 2, because the adhesive does not bond as firmly to the vehicle body work as it does to the foam and, therefore, a degree of repositioning is more easily achieved in the embodiment of FIGS. 1 and 2.

In the case of the embodiment of FIG. 3, it may be difficult to remove the face (13) from the adhesive track (6) if the loop has not been positioned correctly in the first instance, unless the face (13) is treated with a material which reduces the strength of the bond to that face.

Figure 4:
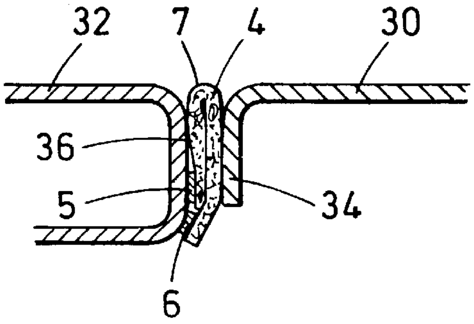
FIG. 4 is a section through part of a bonnet lid and adjacent wing portion.

FIG. 4 illustrates an advantage of the present invention for masking gaps between a bonnet lid (or hood) (30) and a surrounding panel (32). In this aspect of the invention a foam strip (4) can be bonded either in the manner shown in FIG. 1 or in the manner shown in FIG. 3, to form a very tightly packed seal within the gap between the panels (30) and (32). This has a particular advantage in the case of bonnet lids having a downwardly directed flange (34). The flange (34) can act as a scraper blade displacing packing inserted between the surfaces (30) and (32) in order to seal the gap.

With a strip in accordance with the invention, the two edges can be adhered to a surface (36) depending from the surface (32) in such a way that the web is tightly adhered to the surface (36). The closure of the bonnet lid (30) then shows no tendency to displace the foam strip from its adherence to the surface (36).

Figure 5:
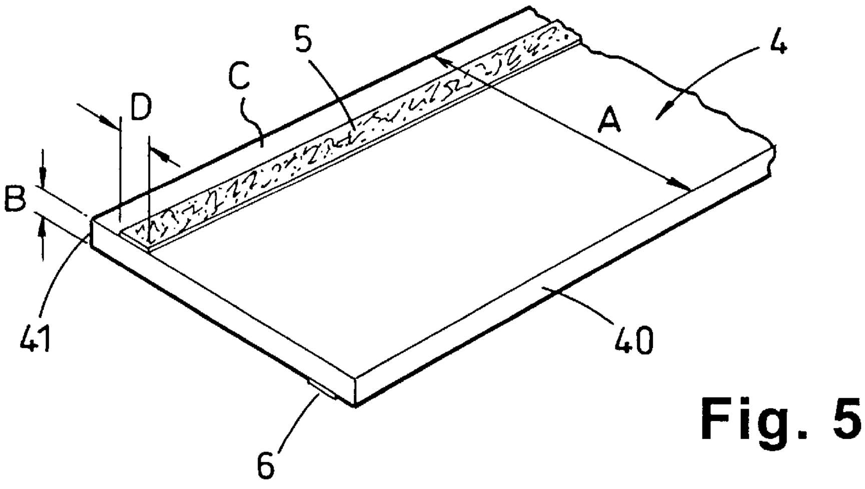
FIG. 5 is a perspective view of a strip in accordance with the invention.

FIG. 5 shows a perspective view of one embodiment of the strip in accordance with the invention. The strip comprises an elongate strip of foam of generally rectangular cross-section having a width (A) and a thickness (B). Typically, the strip has a width (A) of from about 20 to about 80 mm, e.g. about 50 mm, and a thickness (B) of about 3 to 10 mm, e.g. about 5 mm. The strip is formed with a continuous or discontinuous track or band of adhesive (5 and/or 6). The bands of adhesive preferably being close to but not immediately adjacent an edge of the strip. Typically, the strip is spaced by a distance (C) of about 2 to 6 mm from one edge and also, preferably, the strips (5 & 6) are close to opposite edges (40 and 41) of the strip. The adhesive tracks may be, for example, from about 2 to 10 mm in width (D), e.g. about 2 to 6 mm, preferably 4 to 5 mm. The foam strip may be coiled in lengths of say 5 to 10 metres, with or without intervening release paper.

Figure 6:
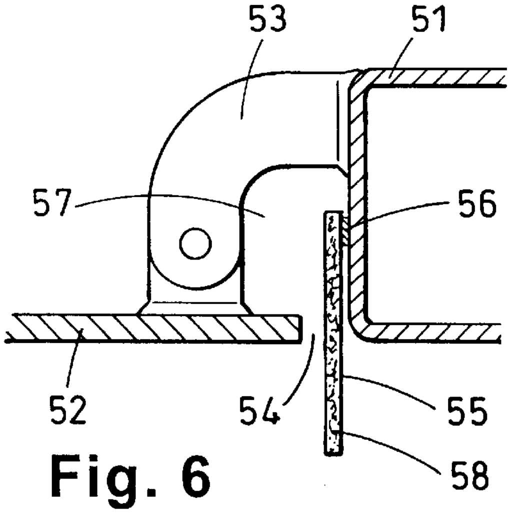
FIG. 6 is a section through an A-frame of a vehicle door in the region where it is hinged, showing a second embodiment of the invention.

FIG. 6 illustrates a method of sealing a gap between an A-post and a door (52) of a vehicle hinged to the A-post (51) by hinge (53). The gap (54) between doors and A-posts or between the top frame and the door of a top-hinged tail-gate are difficult to seal by conventional means. In accordance with the invention this is achieved in the following manner.

A strip in accordance with the invention (55) is provided with a single adhesive track (56) adhered to one edge and the strip (55) protrudes through the gap (54). Using a coin or spatula, the free edge (58) is then tucked into the space (57) so that between of its inherent flexibility, the resulting coiled strip (55) bears against the inside edge of the door (52) and seals the gap.

Figure 7:
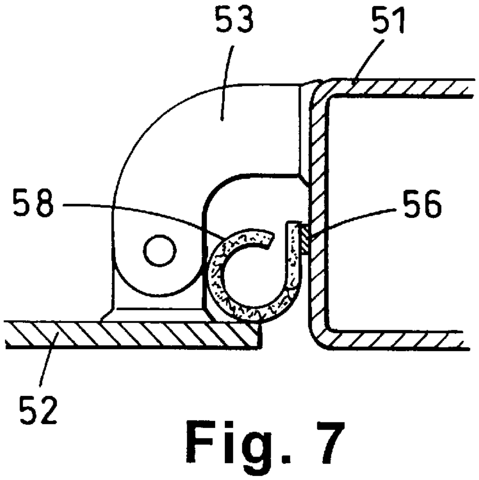
FIG. 7 is a view similar to FIG. 6 after tucking the edge of the strip into the space between the A-frame and the door panel.

FIG. 7 depicts the situation after the free end (58) of the strip has been tucked into the space (57), thus closing the gap (54) between the A post and the door panel (52).

The arrangement shown in FIGS. 6 and 7 can also be used to prevent paint from entering the gap between the top of a tail gate and the top supporting frame.

Figure 8:
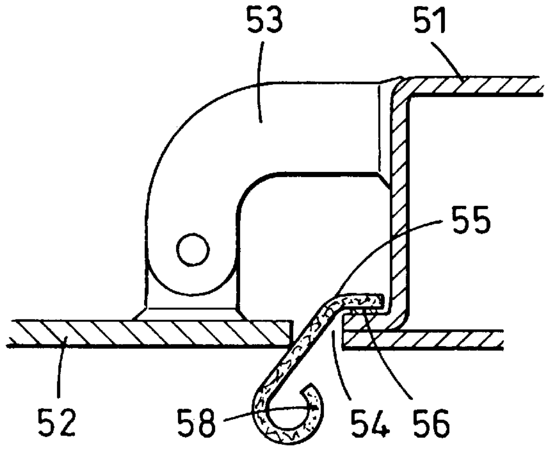
FIG. 8 is a section through an A-frame of a vehicle door similar to FIG. 6.
Figure 9:
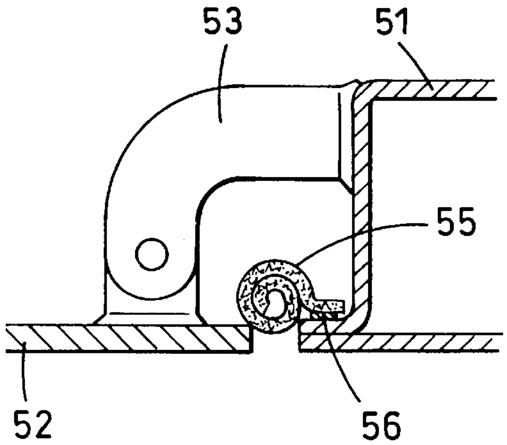
FIG. 9 is a view similar to FIG. 7 but after rolling and introducing the strip into the gap in a different manner.

FIGS. 8 and 9 show similar views to FIGS. 6 and 7 of sections through the A-frame and surrounding door portions and the same reference numerals have been used to indicate equivalent components. In FIG. 8, one longitudinal edge of the strip (55) has been bonded to the inside of a flange attached to the A-post (51) by an adhesive track (56) so that the strip projects from the gap. The longitudinal edge (58) is rolled inwardly to form a tightly rolled coil which is then pushed into the gap as shown in FIG. 9. The strip can be rolled in portions of about 2~3 inches along its length and each rolled portion pushed substantially into the gap. The strip remains substantially coiled and effectively seals off the gap.

We claim:

1. A method of spray painting a vehicle having adjacent body panels, at least one of which comprises a surface to be painted, such panels having a gap therebetween and said method comprising releasably adhering one edge of an elongate foamed plastics strip with adhesive to the vehicle in the region of the gap but spaced from the surface to be painted, forming a loop longitudinally of the strip so that the loop lies within the gap and extends substantially parallel therewith and has an outer curved surface facing outwardly from the cap and applying a paint spray to said surface, whereby the loop prevents paint from entering the gap.

2. A method according to claim 1 wherein the loop is positioned so that its outer curved surface lies substantially parallel to the surface to be painted.

3. A method according to claim 1 wherein said strip is releasably adhered to the vehicle by means of an adhesive track applied on opposite faces of the strip, each said track extending longitudinally of the strip.

4. A method according to claim 1 wherein the foam comprises open-celled foam.

5. A method of painting a vehicle having adjacent body panels, at least one of which comprises a surface to be painted, having a gap therebetween, said method comprising releasably adhering one edge of an elongate foamed plastics strip with adhesive to the vehicle within the gap, forming a loop longitudinally of the strip so that the loop lies within the gap, and has an outer curved surface extending towards said surface to be painted, and wherein the adhesive is confined to edge portions of the strip, and applying a paint spray to said surface, whereby the loop prevents paint from entering the gap.

* * * * *